March 17, 1953  F. J. ABRAHAM  2,631,658

ENGINE SPEED REGULATING FUEL SUPPLY CONTROL

Filed June 21, 1948

INVENTOR.
FRANK J. ABRAHAM
BY
Reynolds & Beach
ATTORNEYS

Patented Mar. 17, 1953

2,631,658

UNITED STATES PATENT OFFICE 2,631,658

ENGINE SPEED REGULATING FUEL SUPPLY CONTROL

Frank J. Abraham, Seattle, Wash., assignor to Boeing Airplane Company, Seattle, Wash., a corporation of Delaware Application June 21, 1948, Serial No. 34,247

12 Claims. (Cl. 158—36.4)

The present invention pertains to fuel supply control apparatus for jet engines of the gas turbine type, particularly as applied to the propulsion of aircraft. It is a general object herein to govern the speed of a jet engine automatically by governing fuel delivery rate to compensate for such disturbing influences upon engine speed as variations in atmospheric conditions, variations in load on the engine, or in factors directly influencing fuel pressure, such as high speed maneuvers of the aircraft causing fuel pressure to rise or fall at the source through inertia effects. Dependably constant operating speed at each throttle setting of the engine not only aids in navigation, but naturally provides a greater degree of control over the aircraft executing different flight operations; and it may be true in military operations where timing is critical that precisely regulated speed is tactically essential.

While the invention is described herein as applied to aircraft jet engines of the gas turbine type, since the control problem is particularly important therein, nevertheless it should be understood that it is not necessarily limited in this regard, since the regulation of fuel supplied to an engine as a means of governing the speed of such engine can be an important problem in other types of installations as well and with other liquid fuel burning type engines.

In its essence, the fuel supply control as illustrated comprises a fuel pump of the centrifugal type, which is rotated at a rate determined by speed of the engine's turbine, and coactive automatic flow control means associated with the pump, which are sensitive primarily only to net pump-pressure changes in the fuel, to restrict the flow of such fuel to the engine proportionately. By such an arrangement, if the speed of the engine should increase above a predetermined value the resulting increase in pump centrifuge pressure effects the desired actuation of the flow control means to restrict the flow of fuel until speed of the engine is again restored to its initial value, whereas the reverse action occurs upon a decrease in engine speed below a predetermined value. Variations in pressure of fuel at the pump not the result of engine speed fluctuations are separated from those which are, to improve the degree of constancy afforded. A simple flow control adjustment of the apparatus, in the nature of a throttle setting, enables changing the speed of the aircraft at will over a wide range, while each setting establishes a corresponding basic speed, at which governing takes place in the desired manner.

In a conventional gas turbine jet engine, the turbine rotor is located in a chamber behind the combustion spaces and ahead of the expulsion jet tube, and does not materially impede the driving efficiency of the expelled gases passing through the tube, since the turbine is located a sufficient distance ahead of the tube and ahead of a gas collecting chamber. The turbine rotates at high speed which is related directly to exhaust rate of the products of combustion, and it serves the principal function of driving an air compressor rotor located in the forwardly opening air-intake passageway of the engine to feed compressed air continuously to the burners in the combustion chamber spaces.

More air than is actually needed for combustion passes through the engine, the primary purpose of this excess air being to reduce the temperature of the gases leaving the burners to a point where they will not damage the turbine wheel blades. Variations in the air pressure as it enters the engine will increase or decrease this excess supply of air, and affect the speed of the engine. For instance, the entering air pressure increases due to increasing ram effect as an airplane driven by a gas turbine gains flying speed when taking off. Under these circumstances the greater weight of air passing into the compressor will necessitate more power to compress it, and if the compressor is driven by the turbine under constant fuel flow the turbine will slow down. A decline in entering air pressure such as occur at high altitudes will correspondingly decrease the amount of excess air entering the compressor, reducing the power needed to drive the compressor, and the engine will speed up. Such variations in speed are highly undesirable.

To regulate speed by fuel supply control the invention contemplates utilizing as a standard of speed, the rotation of the turbine. Moreover, fuel delivery rate is regulated, rather than air intake flow, because the effective range of control may be greater in the former instance, the apparatus simpler and less costly, and less wasteful of fuel. A centrifugal type fuel pump is utilized not only because of the uniformly continuous fuel supply pressure which it affords, but because the output pressure of such a pump increases with turbine speed in a manner closely approximating the direct fuel requirements of the engine.

As a feature of the invention the illustrated flow control means, operatively connected in series with the pump, comprises coacting valve elements one of which is set at will to a desired operating position determining aircraft speed, and the other of which is adjusted automatically relative to the first element by pressure-actuated piston means sensitive primarily only to the component of pump pressure attributable to engine speed. The position of the first valve element establishes a normal or basic fuel passage effective opening, whereas the second and coacting valve element blocks off a controlled portion of that opening.

As a further feature, one of the valve elements has a by-pass opening through which fuel may pass at all times during operation of the engine despite closing the first valve element suddenly or otherwise. This insures maintaining a fire in the burners in the event the pilot accidentally, or deliberately for tactical reasons, suddenly adjusts the throttle from an open position to normally fully closed position to decrease the speed of the aircraft. Because the pump output pressure is related directly to speed of the engine's air compressor, the minimum quantity of fuel supplied to the engine through the by-pass will thereby be greater at higher speeds, as required, and always sufficient to prevent extinguishing the fire despite the rush of air through the combustion chamber. At lower speeds the reduced pump pressure forces fuel through the by-pass in smaller quantities. The stand-by or pilot fire is thereby smaller at lower speeds than it is at higher speeds, as desired. When the engine is again called upon for power by adjusting the throttle it is then always in ready condition to respond immediately without necessity of restarting.

A further feature of the mechanism includes automatic shut-off means embodied in the flow control apparatus, operable to interrupt the flow of fuel to the engine when the turbine is stopped or is rotating at a speed which is insufficient to keep the engine running. This arrangement automatically prevents flooding the engine burners with fuel to make starting difficult following a period of idleness. When the engine is next started the turbine can be rotated by a starting motor until the pump speed is sufficient to reestablish delivery of operating fuel to the burners in the normal manner, automatically opening the shut-off means, after which engine operation becomes self-sustained. As an alternative mode of starting the engine, fuel can be supplied to the burners from an auxiliary supply, which shuts off after the engine is started and fuel is again being delivered normally by the pump.

In its preferred and illustrated form, the apparatus implementing the invention is so constructed that the centrifugal pump and the flow control mechanism responsive to engine speed are combined together in a compact, rugged and integrally constructed unit, readily capable of manufacture and adapted to be installed in confined quarters for connection to the turbine-compressor shaft. Such a unit is easily serviced and maintained and is extremely rugged and reliable in its operation, utilizing a minimum number of movable elements and short fuel ducts which are not easily clogged or otherwise obstructed. It will be understood, however, that the principle of the invention, in broader terms, may be embodied in apparatus of different constructions. Although not practically recommended, the centrifugal fuel pump and control valve mechanism could be separately constructed and mounted apart from one another, for example, without altering the basic concepts.

These and other features, objects and advantages of the invention, including a preferred novel organization of cooperable parts, will become further apparent upon consideration of the following description taken together with the accompanying drawings.

Figure 1:
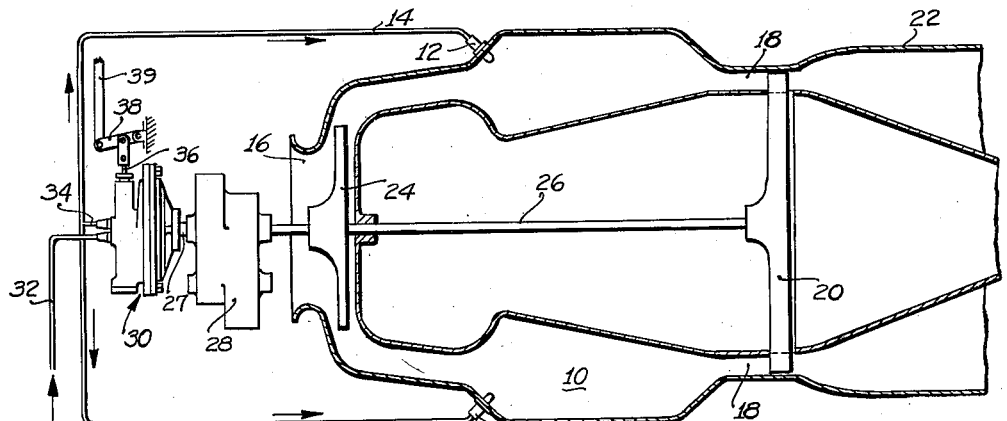
Figure 1 is a simplified side elevation of a jet engine installation employing the system of the invention.

In Figure 1 fuel is injected into the combustion chamber 10 of the jet engine by a burner nozzle 12, supplied by fuel pipe 14. A number of such combustion spaces and accompanying nozzles are usually employed in such engines, arranged peripherally. Combustion air enters the engine continuously through the forwardly opening throat 16 and divides into separate streams which flow to the respective combustion spaces. After combustion occurs in chamber 10, which it does continuously, the resulting streams of hot gases combine and flow rearwardly toward the jet tube (not shown) from left to right in the figure—to be constricted into a high-velocity stream and exhausted into the atmosphere, to provide the well known jet propulsion effect.

Before combining preparatory to expulsion in this manner, however, the gases pass through a semirestricted passageway 18 leading from the combustion chamber, to pass over the buckets or blades of the gas turbine rotor 20, which they thereby drive at a high velocity. After leaving the turbine the gases then collect and gather pressure, removing turbulence, in an enlarged chamber 22 immediately before escaping through the jet orifice.

Turbine 20 serves the primary function of driving air compressor 24 which is mounted in the throat passageway 16 leading into the combustion spaces 10. The turbine and compressor rotor elements are interconnected by a common axial shaft 26, which in this instance extends forwardly of the engine beyond the compressor location for connecting with the speed-reduction gear unit 28 by which to drive, through shaft 27, the centrifugal pump rotor in the fuel supply control unit 30 to be described herein.

Fuel enters the control unit 30 by a pipe 32 leading from the fuel storage tank of the aircraft, and is delivered by the unit at increased pressure to the supply pipes 14, through outlet pipe 34, to flow in the direction of the arrows to the several burners.

It may be explained preliminarily that the fuel delivery rate establishing the speed of the aircraft is determined conveniently by the positioning of a control rod 36 connected to the control unit. The rod may be shifted in position at the will of the pilot by lever bar 38 and connecting link 39 reciprocating the rod, link 39 extending to the pilot's cockpit or other control point in the aircraft. However, it will be evident that the particular external mechanism by which the unit 30 is adjusted for establishing aircraft speed is of no special consequence in the practice of the invention.

Figures 2, 3:
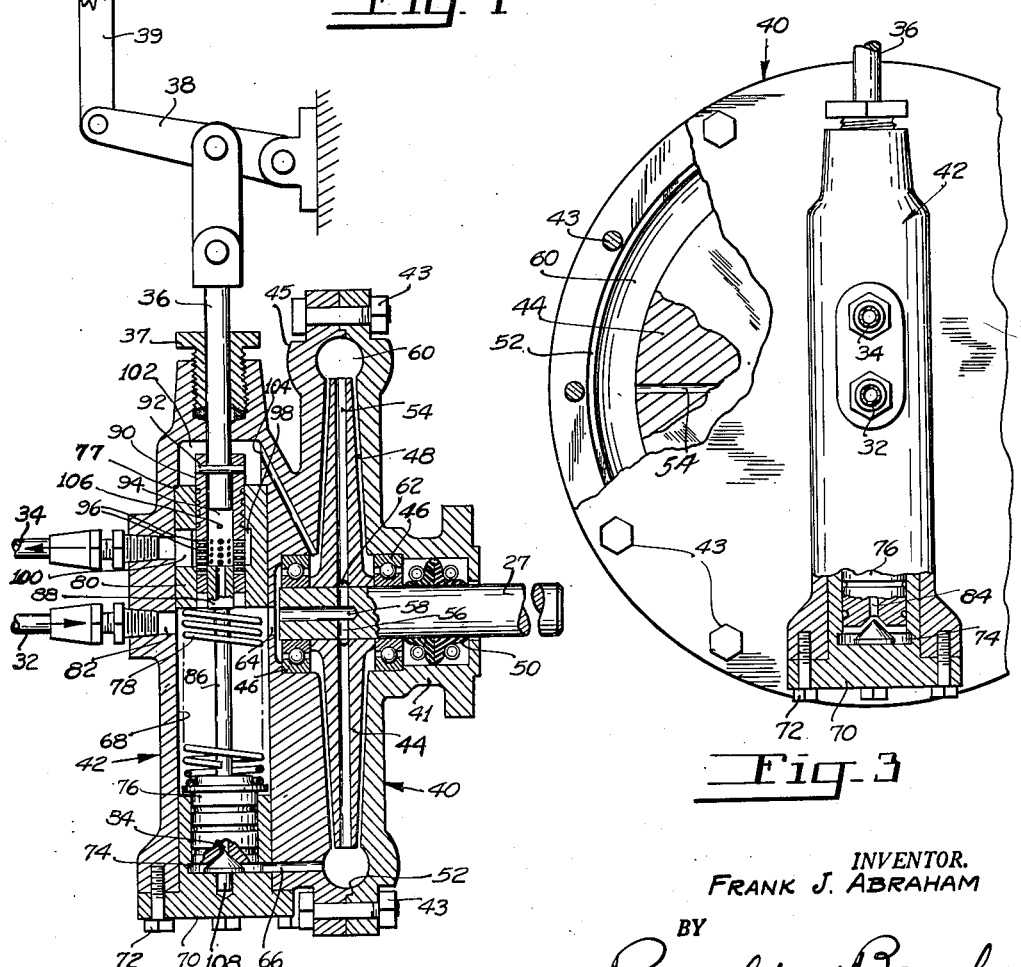
Figure 2 is a transverse sectional view of the pump and fuel supply control unit, the section being taken approximately at the mid-plane of the device.
Figure 3 is an end view of the unit viewed toward the end thereof remote from the pump drive shaft.

There are no compelling reasons for the particular illustrative shape of the control unit, the arrangement of its parts, and the location of the various parting lines of its housing or casing, since they rest largely upon convenience in casting and machining the various parts and to some extent upon the mode and location in which it will be mounted in the aircraft. For purposes of convenience in discussion, the unit's casing or shell may be considered as comprising a pump housing portion 40 and a valve housing portion 42, although these portions are preferably closely integrated in form, with various parts in common. Figures 2 and 3 both show the portions referred to and illustrative generally the oblate or disk-like form of the pump housing portion 40, and the elongated cylindrical form of the valve housing portion 42 which is joined to the former, disposed diametrally along one side thereof. The two portions therefore have a common wall section beyond which extends the general inner side 45 of the pump housing, whereas the latter's outer side constitutes a closing cover mounted detachably to the side 45 by means of bolts 43 clamping together the peripheral flanges of the two sides of the pump housing. The parting line between the two pump housing sides and flanges generally coincides with an equatorial plane through the pump housing, disposed at right angles to the axis of the pump drive shaft 27.

The cover side of the pump housing has a central projecting collar 41, bored and apertured to receive the pump drive shaft 27 and suitable ball bearing and packing elements engaging the shaft and surrounding bore wall.

Shaft 27 is journaled in the pump housing by spaced ball bearing elements 46 located at either side of the pump rotor 44 on shaft 27, one being received in the bore of collar 41, as mentioned, and the other in a complemental recess in the pump housing inner wall opposite the collar. Between the recess and the collar bore, an enlarged communicating disk-shaped cavity 48 is formed concentric with shaft 27, within which the rotor 44 is free to rotate. The cavity walls are defined by the complementally cupped or concaved inner faces of the pump housing sides.

The disk-like pump rotor 44 is keyed or similarly secured to shaft 27 whereon it is held against endwise movement by the bearings 46 engaging its hub end surfaces to preserve the close spacing between adjacent pump cavity and rotor side walls. Uniformly angularly spaced radial bores 54 in the rotor communicating between its periphery and hub bore surfaces define centrifuge passages through which fuel is flung outwardly by rotation of the rotor. The inner ends of the passages communicate with an end-opening axial bore 58 in shaft 27 through shaft bores 56, in the end of the shaft nearest the valve housing. As the pump operates, fuel is then drawn in through bore 58 and forced outwardly through bores 56, 54 by centrifugal action to develop the requisite fuel pressure in an annular collecting duct 60 forming the peripheral boundary of cavity 48 in which the pump rotates. Because the centrifugal pump produces a pressure which increases with speed and is substantially independent of rate of flow over the operating range of the system, such a pump functions ideally for purposes of the invention.

The pump housing is sealed against leakage of fuel therefrom at the parting line formed between the flanges by machining the flange interface surfaces with interlocking shoulders 52, clamped tightly together by the bolts 43. It is sealed at the entrance of shaft 27 through collar 41 by suitable packing rings 50 pressed into the annular space between the bore wall of the collar and the shaft surface, as indicated.

In the preferred construction illustrated, at the inner end of passages 54 the rotor bore encircling shaft 27 has an annular groove 62 into which open the radial shaft bores 56, as well as the inner ends of rotor bores 54, for passage of fuel therebetween through the intermediate groove. This groove, constituting an interconnecting passage, enables reducing the number of bores 56 in shaft 27 to a minimum of four or less, which avoids weakening the shaft seriously were the number of bores 56 increased to correspond to those in the rotor, each to communicate with one of the latter. If desired, however, rotor 44 may be constructed integrally with shaft 27, eliminating any need for intermediate groove 62 to avoid weakening the shaft.

Fuel enters the pump cavity through the comparatively large opening 64 in the common housing wall 45 between the pump housing portion and the valve housing portion at a location opposite the bore 58, and passes into the centrifuge by which it is forced outward and flows under pressure into collecting duct 60. The faster the rotation of shaft 27 the greater, of course, will be the pressure differential between fuel collected in duct 60 and that being drawn into the bore 58 through the opening 64. To withdraw pressure-fuel from duct 60 for delivery to the engine burners it is only necessary to tap the duct at a suitable location, such as by the entering bore 66 formed in the common housing wall. Fuel in duct 60 then flows around the sides of the duct to the outlet point and into the passages of the valve housing 42, to be described, thence to the engine.

The valve housing 42 comprises a tubular shell open at one end and whose cylindrical bore 68 contains various valve components. A plug 70 is received in the open end of the shell, held therein by bolts 72 engaging the body of the housing. The plug itself defines an inwardly opening hollow cylinder whose cylindrical bore is enlarged in diameter at its closed end to define a fuel chamber 74 which communicates through passage 66 with duct 60. Piston 76, coacting with the plug cylinder, is thereby actuated by pressure-fuel entering the enlarged end space 74 of the plug to force such piston inwardly of the valve housing bore 68 toward its closed end remote from passage 66 in opposition to helical compression spring 78. This spring reacts from fixed valve sleeve 80 bearing against bore shoulder 77. Spring 78 yields resiliently to fluid pressure induced movements of piston 76, but tends to return the piston to the closed end of the plug. Added to the force of the spring, in this connection, low pressure fuel entering the valve housing bore 68, through fuel intake opening 82 opposite dividing wall opening 64, also presses endwise against the inner end of piston 76, working against fuel pump output pressure. The absolute output pressure of the pump acting on the outer end of the piston also varies with pressure of fuel entering through bore 68, because such output pressure necessarily equals input pressure plus centrifugally created pump pressure.

This arrangement makes the unit substantially insensitive to static pressure variations in the intake fuel delivered from the supply tank; since such variations act substantially equally on both ends of the piston and thereby cancel. The net pressure of fuel on piston 76 is that created solely by rotation of the pump and as a function of engine speed only. If for any reason the pressure of fuel entering the valve housing bore 68 through port 82 changes, such as by a maneuver of the aircraft piling up fuel in the supply tanks, by inertia of the fuel at such times, or merely by changes in level of the storage tank fuel, there will be no immediate substantial disturbing effect upon the position of valve element 88, inasmuch as such increase in pressure will be felt at both ends of piston 76, so that the differential in pressure determining the position of piston 76 will remain the net output pressure of the pump. The flow of fuel through the valve system into outlet pipe 34 is determined predominantly by pump output pressure establishing the valve settings, and to a lesser extent by such pressure forcing flow of fuel through the valve ports irrespective of the number uncovered at a particular valve setting.

Fuel entering the valve housing from pump outlet duct 66 continues through a central aperture 84 in piston 76, and through valve-actuating tube 86. This tube interconnects an inner valve element 88 and the piston for automatically controlled operation of such valve element in a manner to be described. An outer valve element 90 encircles valve element 88, and each valve element 88 and 90 is free to slide axially of the valve housing and with respect to one another. The inner valve element 88 closes that end of tubular valve element 90 which is nearest piston 76, whereas the control rod 36, secured by pin 92 to the outer valve element 90, closes off its opposite end, to define a fluid chamber 94 within valve element 90. Fuel under pump pressure flowing in tube 86 from the pump enters the chamber 94 through the central aperture 84 in the inner valve element, as shown.

Outer valve element 90 has a plurality of small ports or radial openings 96 spaced at short intervals around its circumference and also over a portion of its length, which communicate between the fluid chamber 94 and the surrounding annular collecting cavity 98 formed within the mid-portion of sleeve 80. Pressure-fluid in chamber 94 flows outwardly through the radial ports 96 into the annular collecting cavity 98, thence successively through an outlet opening 100 in the sleeve 80, and through an appropriate aperture in the valve housing wall into outlet tube 34.

While pressure-fuel passes centrally through the valve housing the surrounding portion of bore 68 between valve elements and piston is reserved for reception of inflowing low-pressure fuel before it passes through opening 64 into the pump, as explained previously. To this end the high pressure passages in the valve housing are well sealed from the low pressure portions by the close fit of parts. Any fluid which may leak endwise past the sides of outer valve element 90 and into the low-pressure portion of bore 68 is slight, and, in any event, simply joins the inflowing fluid passing to the pump where it is recirculated once again into the high pressure side of the system. Similarly, any fuel which escapes endwise past the outer surface of valve element 90 in the direction of control rod 36 enters an annular collecting chamber 102 at the closed end of the valve housing, which communicates through a small bore 104 in the housing wall with a low pressure point in the pump cavity, such as that adjacent the inner of bearings 46, where such returned fluid may flow past such bearing into the open end of axial bore 58 for recirculation by the pump in the same manner. However, the amount of fluid escaping into chamber 102 is slight. Control rod 36 is suitably packed by gland 37 for sliding in an aperture in the end of the valve housing remote from the piston, without leakage of fuel around the rod.

The number of radial valve port holes in valve element 90 may be determined upon the basis of the desired degree of sensitivity or selectivity in the adjustment of fuel flow through the valve assembly, whereas the length of the portion of element 90 over which the closely spaced holes extend will depend in any installation upon the desired range of movement of element 90 lengthwise of the unit, effected by adjustment of control rod 36 to secure a sufficient variation in flow of the fuel for control purposes. To restrict flow through the port openings, either they are moved past the end of port 100 in sleeve 80, as a fixed mask, or valve element 88 is moved past the ports 96, to mask them more or less. The flow passage may be completely closed at will by moving control rod 36 inwardly of the housing until all of the port openings 96 are covered by the sleeve 80, or to any intermediate position desired to effect a predetermined flow of fuel through the system, establishing a normal or basic engine speed upon which governing action is superimposed.

After engine operating speed has been selected by movement of valve element 90 to a fixed position, inner valve element 88 comes into effect to regulate flow automatically by pressure of the pump output fuel upon piston 76 actuating the latter valve element. For example, should engine speed increase above the established value, resulting in an increase in fuel pressure in collecting duct 60, piston 76 will be pressed inwardly of the valve housing bore 68, causing inner valve element 88 to slide over and mask an increasing number of valve port apertures 96 in element 90 to restrict further the flow of fuel through outlet pipe 34. On the other hand, a decrease in fuel pressure in the output side of the pump will permit spring 78 to move piston 76 and thus valve element 88 oppositely to uncover a greater number of port apertures 96, increasing the flow of fuel to the engine. As long as the engine speed remains substantially constant, no change will occur in the position of valve element 88.

Under normal conditions of operation of the system thus far described, the speed of the aircraft engine may be shifted progressively in one direction or another at the will of the pilot, as explained, simply by making control adjustments of rod 36, shifting valve element 90 one way or the other in sleeve 80. For each operating position of valve element 90 the spring and piston mechanism controlling the inner valve element 88 will seek and maintain a related operating position about which regulatory movements take place in preserving constancy in the flow of fuel. It will be understood, of course, that the various adjusted positions of control rod 36 do not necessarily reflect precisely corresponding velocities of the aircraft under all operating conditions, inasmuch as such factors as ambient pressure and temperature in which the jet engine is working at different times will likewise influence aircraft speed. If a particular engine speed at sea level is to be obtained at very high altitudes, for example, a different setting of control rod 36 will usually be required, although the required change in setting will be comparatively small because of the governing action of the valve system preventing a substantial change in speed of the engine without any further assistance. For changes in altitude of the aircraft of 15,000 feet or less usually no change in setting of the control rod is necessary.

Certain other operating requirements should also be met, however, namely the continual preservation of a pilot fire in the engine's burners at all times when the aircraft is in flight, and the automatic shut-off of the fuel supply system when the engine is idle. The first objective is accomplished by the provision of an auxiliary pilot flow port 106 in valve element 90, through which fuel is permitted to pass although such valve element has been moved into such registering position with sleeve 80 that all of the other port apertures 96 are closed. Accordingly, pilot flow port 106 is spaced a certain minimum distance from the circumferential row of port apertures 96 nearest rod 36, so that it will clear the inmost end of valve element 88 in its operative position corresponding to maximum operating fuel pressure produced by the pump, and will also clear the adjacent masking wall of sleeve 80. Consequently, if by accident, or deliberately, the pilot should suddenly move the throttle of the aircraft to closed position, covering all of the port apertures 96, when the aircraft engine is operating at a high speed, fuel will continue to flow to the engine nevertheless through port 106 in sufficient quantities to prevent the burner flames from being extinguished by the rush of air through the combustion chambers of the engine, although the engine will have been reduced, in effect, to an idling condition of operation.

The other condition referred to, calling for automatic closure of the fuel supply system when the engine is idle, is met conveniently by utilization of the high pressure end of piston 76 nearest the pump outlet, as a shut-off valve element coacting with a fixed conical plug 108 entering a central complementally shaped recess in such end of the piston. Piston bore 84 is therefore closed when the piston and plug engage, which takes place when the engine speed becomes so low that the pump output pressure is no longer sufficient to overcome the force of spring 78 to preserve a separation between plug and piston. The fuel supply may be cut off in this manner and the engine stopped either by braking the engine below a predetermined idling speed closing bore 84, or by turning a valve in one of the pipes 34 or 32 to shut off the fuel supply from the storage tanks.

I claim as my invention:

1. Speed controlling and regulating apparatus for a liquid-fuel burning engine having a shaft driven thereby, comprising a fuel pump adapted to be driven by such shaft and being of a type operable to produce a pressure difference directly related to shaft speed, a pumped-fuel line adapted for delivering fuel to the engine, valve means establishing an adjustable flow restriction in said fuel line for controlling engine speed, said valve means including a first movable control element operable to vary the effective flow-restricting adjustment of said valve means, throttle control means movingly connected to said first movable element for controlling engine speed thereby, said valve means further including a second movable control element operatively connected to the first movable control element and movable relative thereto for further varying the effective flow-restricting adjustment of said valve means in substantially equal degree per increment of such latter movement in each of the varied adjustments of said valve means established by said first movable valve element, and speed regulating means including a pump-pressure-actuated member movingly connected to said second movable control element for reducing flow in the fuel line responsively to increase of pump pressure, and resilient means opposing such pressure actuated movement of said member.

2. The apparatus defined in claim 1, wherein the fuel pump is of the centrifugal type.

3. The speed regulating apparatus as defined in claim 1 and wherein the valve means further includes a pilot flow port therein of a size to maintain a pilot-fire-maintaining flow of fuel to an engine at all operating speeds thereof despite normal or sudden closure of the valve means at such speeds.

4. In a fuel supply automatic control means for liquid-fuel burning engines, including gas turbine type jet engines, means comprising a centrifugal type primary fuel pump operable to deliver fuel to an engine and adapted to be driven operatively thereby, fuel supply duct means connected to the output of said pump and adapted to be connected for delivering fuel to an engine from said pump, and valve means coacting with said supply duct means, operable automatically in response to increased pump pressure to restrict flow of fuel through said supply duct, and conversely, to open such restriction in response to decreased pressure of fuel produced by said pump, as determined by the speed of said engine, said valve means comprising a ported casing, a first valve member disposed operatively therein, perforated to allow passage of fuel through a port in said casing, a second, cooperable valve member registerable with said first valve member by relative movement of such members to effect masking said first valve member's perforations to check flow of fuel through said first valve member and thereby through said casing, said valve members being movable relatively and relative to said casing, valve actuating means operatively connected to one of said valve members for effecting movement thereof toward flow-restricting position relative to the other such member automatically in response to increased pressure of fuel produced by said pump, means resiliently opposing such movement of said valve actuating means and valve member actuated thereby, and independently operable control means operatively connected to move the other of said valve members relative to and independently of said pressure actuated valve member, thereby to establish a selected normal restriction to flow of fuel to an engine through said first valve member and said casing.

5. The fuel supply automatic control means defined in claim 4, in which the first valve member comprises a sleeve having a plurality of wall perforations therein, such perforations being located at intervals along a portion of its length, said sleeve being slidable lengthwise within the valve casing, and the second valve member comprises a plunger slidably received within said sleeve and movable lengthwise thereof to progressively mask and unmask its wall perforations thereby.

6. The fuel supply automatic control means defined in claim 4, in which the first valve member comprises a sleeve having a plurality of wall perforations therein, such perforations being located at intervals along a portion of its length, said sleeve being slidable lengthwise within the valve casing, and the second valve member comprises a plunger slidably received within said sleeve and movable lengthwise thereof to progressively mask and unmask its wall perforations thereby, said plunger being bored lengthwise, and the valve actuating means including fuel-pressure-actuated piston means and tubular piston rod means mechanically interconnecting said pistons means and said plunger and also affording a communicating passage for flow of pumped fuel through said plunger bore and said tubular piston rod means, between the interior of said sleeve and the fuel pump outlet.

7. The fuel supply automatic control unit as defined in claim 6, and shut-off valve means cooperable with the piston and arranged in the path of fuel from the pump to shut off the flow of fuel by spring-actuated movement of the piston, effecting engagement thereof with said shut-off valve means by reduced pressure of pumped fuel.

8. A fuel supply automatic control unit comprising a centrifugal pump casing having therein an impeller cavity and being bored centrally to receive an impeller shaft, an impeller received in said cavity, and a drive shaft for said impeller journaled in the bore of said casing and projecting operatively through one end of said casing, a fuel intake opening in the end of said pump casing remote from the projecting end of said drive shaft, communicating with said cavity, said impeller having generally radial fuel passages therein communicating between said fuel intake opening and the periphery of said impeller, a fuel collecting duct arranged about the periphery of and cooperable with said impeller to collect fuel centrifuged outwardly by said impeller, a control valve housing mounted on said pump casing and having a cylindrical bore therein, a pump outlet duct communicating between said bore and said fuel collecting duct for passage of pressure fuel into said bore, piston means coacting with said bore and movable endwise thereof by force of fuel entering said bore through said outlet duct, spring means received in said housing, operable to resist such movement of said piston means, a valve chamber defined within said housing and communicating with said pump outlet duct, a fuel exit in the wall of said housing communicating with said valve chamber, a first valve element disposed movably within said chamber overlying said exit and perforated to pass fuel to said exit from said chamber when moved into registry with said exit, a second valve element cooperable with said first valve element to control passage of fuel therethrough, means guiding said valve elements for movement thereof relative to said housing and to each other, means operatively connecting one of said valve elements to said piston means for controlled movement relative to the other of said valve elements and to said housing, to regulate flow of fuel to said exit from said pump responsively to pressure of fuel acting on said piston means, and control means operable to move the other of said valve elements relative to said piston-controlled element to adjust the flow of fuel through said exit to a selected normal value.

9. A fuel supply automatic control unit comprising a centrifugal pump casing having therein an impeller cavity and being bored centrally to receive an impeller shaft, an impeller received in said cavity, and a drive shaft for said impeller journaled in the bore of said casing and projecting operatively through one end of said casing, a fuel intake opening in the end of said pump casing remote from the projecting end of said drive shaft communicating with said cavity, said impeller having generally radial fuel passages therein communicating between said fuel intake opening and the periphery of said impeller, a fuel collecting duct arranged about the periphery of and cooperable with said impeller to collect fuel centrifuged outwardly by said impeller, a control valve housing mounted on said pump casing and having a cylindrical bore therein, a pump outlet duct communicating between one end of said bore and said fuel collecting duct for passage of pressure fuel into said bore, piston means coacting within said bore and movable endwise thereof away from the end of said outlet duct by force of pressure-fuel entering said bore through said outlet duct, spring means received in said housing and operable to resist such movement of said piston means, a valve chamber defined within said housing extending from the side of said piston remote from said pump outlet duct, a fuel exit in the wall of said housing communicating with said valve chamber, a first valve element guided for movement within said chamber axially of said bore, said element generally overlying said exit and being perforated to pass fuel to said exit from said chamber when in registry with said exit, a second valve element registerable with said first valve element to control passage of fuel therethrough and guided for corresponding movement within said chamber, one element being bored to receive the other, tubular connecting means operatively connecting one of said valve elements and said piston means, and having therein a bore communicating between said valve chamber and said pump outlet duct for passage of fuel therein, said piston being operable to move said one valve element relative to the other of said valve elements and said housing, to regulate flow of fuel to said exit from said pump responsively to pressure of fuel acting on said piston means, and means to move the other of said valve elements relative to said piston-controlled element to adjust the flow of fuel through said exit at a selected normal rate.

10. A fuel supply automatic control unit comprising a centrifugal fuel pump portion including a casing having a fuel intake and outlet therein, and an impeller received operatively within said casing, a control valve portion comprising a housing mounted on one end of said casing and having a bore therein communicating at one point with the fuel outlet of said pump portion, and at a second point, spaced lengthwise of said bore, communicating with the fuel intake of said pump portion, a piston received in said bore and cooperable therewith disposed operatively between said first and second named points therein for movement lengthwise of said bore toward said second point by pressure of fuel entering said bore at said first point, spring means received in said bore, coacting with said piston to resist such pressure responsive movement of said piston, a fuel inlet in said housing communicating with said pump fuel intake therein, valve means mounted in said housing and having a fuel exit communicating with said pump outlet, and further having a valve member operable to close said exit in controlled manner by movement of said member in a direction generally lengthwise of said bore, and means interconnecting said piston and said valve member for valve actuating movement of said valve member effected by pressure of fuel entering said bore urging said piston toward said second point in said bore.

11. The fuel supply automatic control unit as defined in claim 9, in which the interconnecting means comprises a tubular member opening between the valve means exit and the end of the bore remote therefrom, through the piston, as the means of communication between said exit and pump outlet.

12. Fuel feed and control means for a liquid-fuel burning engine subject to varying pressure effects, said means comprising a fuel pump constantly driven at a speed related to engine speed, a pump discharge line, valve means to control discharge from said pump to the engine including a first valve element arranged in the pump discharge line, a control device operatively connected thereto, sensitive to and arranged to be shiftable in response to changes in pump delivery pressure, and thereby to shift said first valve element, a second valve element arranged in the pump discharge line, and movable at will cooperatively with relation to said first valve element for throttle control, and means imposing upon said control device, in opposition to pump delivery pressure, the static fuel pressure existing in the intake to said fuel pump, thereby to substantially cancel the effect on said control device of static fuel pressure as a component of pump delivery pressure.

FRANK J. ABRAHAM.

REFERENCES CITED

The following references are of record in the file of this patent:

UNITED STATES PATENTS

| Number | Name | Date |
|---|---|---|
| 1,958,410 | Schaeren | May 15, 1934 |
| 2,256,963 | Schmidt | Sept. 23, 1941 |
| 2,392,262 | Ramsey | Jan. 1, 1946 |
| 2,407,115 | Udale | Sept. 3, 1946 |
| 2,412,289 | Pugh et al. | Dec. 10, 1946 |
| 2,440,328 | Doble | Apr. 27, 1948 |
| 2,446,523 | Bradbury et al. | Aug. 10, 1948 |
| 2,451,055 | Beacham | Oct. 12, 1948 |
| 2,456,603 | Barfod | Dec. 14, 1948 |
| 2,479,813 | Chamberlin | Aug. 23, 1949 |